US008060250B2

(12) United States Patent
Reiland et al.

(10) Patent No.: US 8,060,250 B2
(45) Date of Patent: Nov. 15, 2011

(54) JOINT-SPACE IMPEDANCE CONTROL FOR TENDON-DRIVEN MANIPULATORS

(75) Inventors: Matthew J. Reiland, Oxford, MI (US); Robert Platt, Houston, TX (US); Charles W. Wampler, II, Birmingham, MI (US); Muhammad E. Abdallah, Houston, TX (US); Brian Hargrave, Dickerson, TX (US)

(73) Assignees: GM Global Technology Operations LLC, Detroit, MI (US); The United States of America as represented by the Administrator of the National Aeronautics and Space Administrations, Washington, DC (US)

( * ) Notice: Subject to any disclaimer, the term of this patent is extended or adjusted under 35 U.S.C. 154(b) by 582 days.

(21) Appl. No.: 12/335,153

(22) Filed: Dec. 15, 2008

(65) Prior Publication Data

US 2010/0152898 A1 Jun. 17, 2010

(51) Int. Cl.
*G06F 19/00* (2011.01)
(52) U.S. Cl. ............... 700/245; 901/2; 901/11; 901/14; 901/19; 901/21; 901/29
(58) Field of Classification Search ............... 318/568.1, 318/611, 632, 568.21–568.24, 606, 615–625, 318/626; 901/1–50; 700/245–264; 446/268–367
See application file for complete search history.

(56) References Cited

U.S. PATENT DOCUMENTS

| 4,860,215 | A |   | 8/1989  | Seraji |           |
|-----------|---|---|---------|--------|-----------|
| 4,974,210 | A |   | 11/1990 | Lee    |           |
| 5,103,404 | A |   | 4/1992  | McIntosh |         |
| 5,207,114 | A | * | 5/1993  | Salisbury et al. | ........... 74/479.01 |
| 5,388,480 | A | * | 2/1995  | Townsend | ................. 74/501.5 R |
| 5,499,320 | A |   | 3/1996  | Backes et al. |    |
| 5,710,870 | A | * | 1/1998  | Ohm et al. | ..................... 700/263 |
| 6,081,754 | A |   | 6/2000  | Schlemmer |       |
| 6,199,271 | B1 | * | 3/2001  | Hahn et al. | ....................... 29/715 |
| 6,226,566 | B1 |   | 5/2001  | Funda et al. |    |
| 6,233,504 | B1 | * | 5/2001  | Das et al. | ........................ 700/260 |
| 6,385,509 | B2 | * | 5/2002  | Das et al. | ........................ 700/260 |
| 6,393,340 | B2 |   | 5/2002  | Funda et al. |    |
| 6,494,039 | B2 | * | 12/2002 | Pratt et al. | ........................ 60/368 |
| 6,532,400 | B1 | * | 3/2003  | Jacobs | ............................ 700/245 |
| 6,840,127 | B2 | * | 1/2005  | Moran | ....................... 74/490.04 |
| 6,999,850 | B2 | * | 2/2006  | McDonald | .................... 700/245 |
| 7,184,858 | B2 | * | 2/2007  | Okazaki et al. | ............... 700/254 |
| 7,260,450 | B2 | * | 8/2007  | Okazaki et al. | ............... 700/254 |
| 7,331,967 | B2 | * | 2/2008  | Lee et al. | ....................... 606/130 |
| 7,363,109 | B2 | * | 4/2008  | Jiang | ........................... 700/245 |
| 7,386,366 | B2 | * | 6/2008  | Dariush | ........................ 700/245 |
| 7,529,632 | B2 | * | 5/2009  | Ueda et al. | ........................ 702/44 |
| 7,699,835 | B2 | * | 4/2010  | Lee et al. | ............................ 606/1 |
| 7,747,311 | B2 | * | 6/2010  | Quaid, III | ..................... 600/424 |

(Continued)

*Primary Examiner* — Khoi Tran
*Assistant Examiner* — Bhavesh V Amin
(74) *Attorney, Agent, or Firm* — John A. Miller; Miller IP Group, PLC

(57) ABSTRACT

A system and method for controlling tendon-driven manipulators that provide a closed-loop control of joint torques or joint impedances without inducing dynamic coupling between joints. The method includes calculating tendon reference positions or motor commands by projecting a torque error into tendon position space using a single linear operation. The method calculates this torque error using sensed tendon tensions and a reference torque and internal tension. The method can be used to control joint impedance by calculating the reference torque based on a joint position error. The method limits minimum and maximum tendon tensions by projecting the torque error into the tendon tension space and then projecting ii back into joint space.

20 Claims, 2 Drawing Sheets

U.S. PATENT DOCUMENTS

| | | | |
|---|---|---|---|
| 7,774,177 B2* | 8/2010 | Dariush | 703/2 |
| 7,795,834 B2* | 9/2010 | Norihisa | 318/630 |
| 2006/0048364 A1 | 3/2006 | Zhang et al. | |
| 2007/0016329 A1* | 1/2007 | Herr et al. | 700/250 |
| 2007/0118252 A1* | 5/2007 | Okazaki et al. | 700/254 |
| 2007/0255454 A1 | 11/2007 | Dariush | |
| 2007/0285040 A1* | 12/2007 | Jenner, Jr. | 318/568.1 |
| 2008/0046122 A1 | 2/2008 | Manzo et al. | |
| 2008/0140257 A1 | 6/2008 | Sato et al. | |
| 2008/0300722 A1* | 12/2008 | Dudek et al. | 700/258 |
| 2009/0182436 A1* | 7/2009 | Ferrara | 623/57 |
| 2009/0209170 A1* | 8/2009 | Richter | 446/297 |
| 2010/0152898 A1* | 6/2010 | Reiland et al. | 700/261 |
| 2010/0161127 A1* | 6/2010 | Abdallah et al. | 700/258 |
| 2010/0168917 A1* | 7/2010 | Roh | 700/258 |
| 2011/0130879 A1* | 6/2011 | Abdallah et al. | 700/260 |

* cited by examiner

JOINT-SPACE IMPEDANCE CONTROL FOR TENDON-DRIVEN MANIPULATORS

STATEMENT REGARDING FEDERALLY SPONSORED RESEARCH OR DEVELOPMENT

The invention described herein may be manufactured and used by or for the U.S. Government for U.S. Government (i.e., non-commercial) purposes without the payment of royalties thereon or therefore.

BACKGROUND OF THE INVENTION

1. Field of the Invention

This invention relates generally to a system and method for controlling a tendon-driven manipulator using closed-loop control. In particular, the joint angle and torque in the joints of the manipulator are controlled in such a way that it reduces coupled transient joint motions and allows for independent motion of the joints.

2. Discussion of the Related Art

Dexterous robot systems typically comprise robot arms and hands that operate to grasp and manipulate objects or parts during assembly or other applications. The term "robot manipulator" is used to describe all or part of one or more robot arms and hands. Tendon-driven robot manipulators are robot manipulators that are actuated using tendons or cables that allow the actuators to be located outside of the part of the manipulator being controlled. Tendon transmissions are frequently used to actuate distal joints in robot manipulators. They can improve strength-to-weight ratios by allowing actuators to be located closer to the base of the manipulator. They also give the mechanical designer more flexibility in actuator selection. For example, when the manipulator is a tendon-driven finger in a humanoid robotic hand, the actuators are typically located in the forearm area of the robotic arm. In this case, tendons extend from the forearm actuators to the fingers, where they are attached.

It is sometimes the case that the number of tendons in a tendon-driven manipulator is associated with a corresponding motion by multiple tendons. This is the case with "n+1" tendon arrangements where n+1 tendons bi-drectionally actuate n joints. n+1 tendon arrangements are useful because they allow bi-directional joint actuation with a minimum number of actuators. However, this presents an extra control burden because the resulting physical coupling between tendons and joints must be decoupled in the control system. During control, the actuators must move multiple tendons so that the tendons do not stretch or break as the manipulator joints move. For one joint motion, there is a plurality of tendon motions that are required to make the joint motion. Thus, there is a complex motion between joint motion and tendon motion.

Known control schemes for controlling the actuators that actuate the tendons are typically hierarchical in nature. Each actuator is associated with a single controller that controls the position of a single tendon or the force applied by a single tendon. A higher level controller sends commands to each of the single-tendon controllers so as to realize a particular joint motion or torque. When this hierarchical approach to control is used, the dynamics of the low-level controllers cause coupled joint motions. In other words, because each low-level controller controls a single tendon, and the motion of a single tendon causes multiple joints to move, the dynamics of the low-level controllers cause coupled joint motions. As a result of this coupling, multiple joints may move when motion of only a single joint is desired. Thus, undesired motions occur in the robotic manipulator.

It is frequently desirable to control joint compliance and torque in tendon-driven manipulators. This is particularly true for robot hands where the tendon driven manipulators are fingers. For these applications, precise control of the dynamics of the forces applied to the environment by the fingers is paramount. For example, compliance control in the joints of robot fingers is an effective way to wrap the fingers around an object, thereby maximizing the contact surface area and improving the grasp. Alternatively, a robot may grasp and lift an object more robustly when the contact forces are accurately controlled. In these applications, it is essential to control joint positions and forces independently and in a dynamically accurate way.

SUMMARY OF THE INVENTION

A system and method for controlling the joint torque and impedance of a tendon-driven robot manipulator is disclosed. The method includes calculating tendon reference positions or motor commands by projecting a torque error into tendon position space using a single linear operation. The method calculates the torque error using sensed tendon tensions and a reference torque and internal tension. The method can be used to control joint impedance by calculating the reference torque based on a joint position error. The method limits minimum and maximum tendon tensions by projecting the torque error into the tendon tension space and then projecting it back into the joint space.

Additional features of the present invention will become apparent from the following description and appended claims, taken in conjunction with the accompanying drawings.

BRIEF DESCRIPTION OF THE DRAWINGS

FIG. 3 is a plan view of a joint system showing a tendon arrangement.

DETAILED DESCRIPTION OF THE EMBODIMENTS

The following discussion of the embodiments of the invention directed to a system and method for controlling tendon-driven manipulators is merely exemplary in nature, and is in no way intended to limit the invention or its applications or uses.

Figure 1:
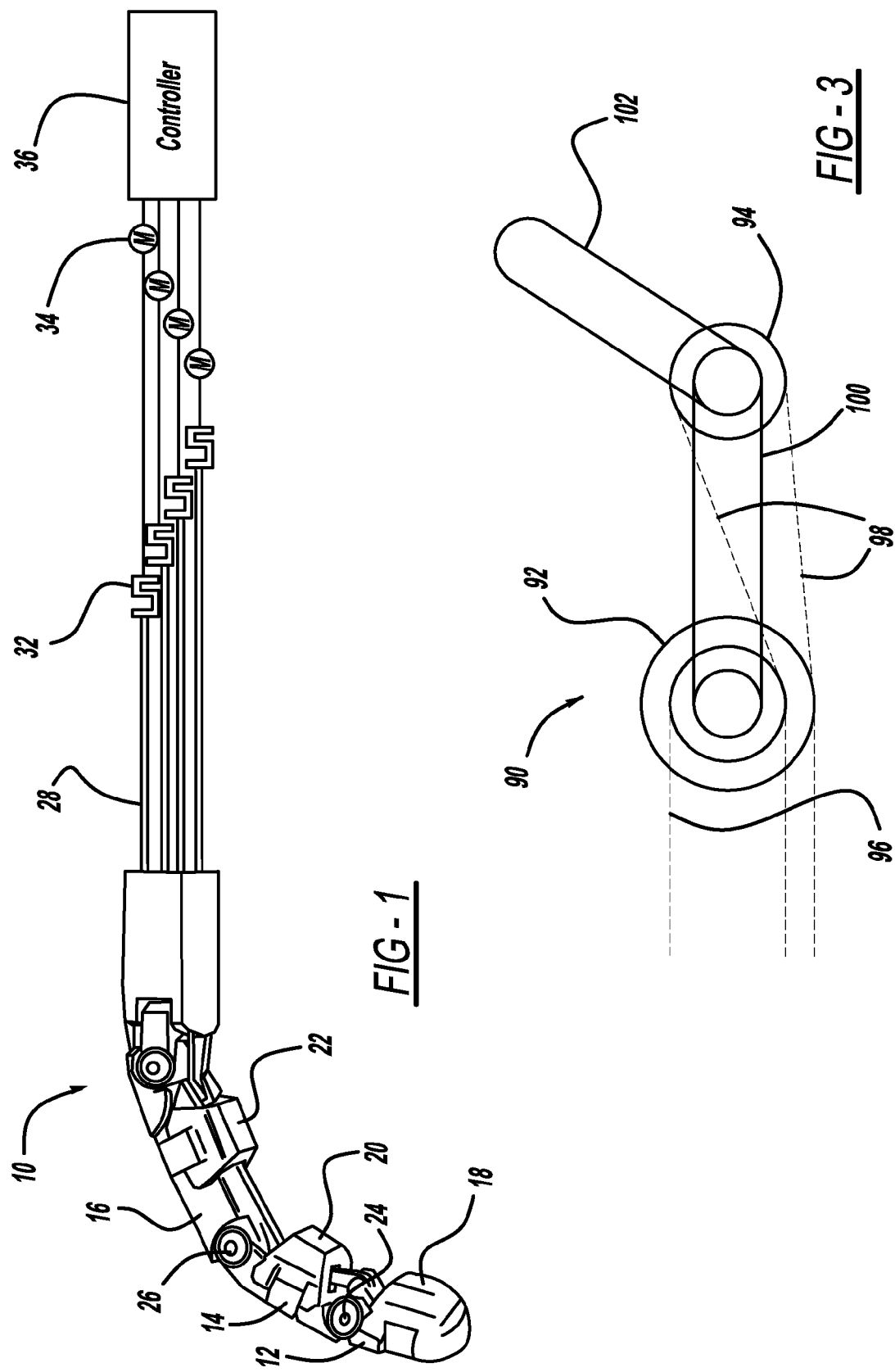
FIG. 1 is a perspective view of a robotic finger including a plurality of tendon driven joints where the tendons that control the joints are controlled by a closed-loop control of joint angle and torque.

The following embodiments apply the present invention to the control of a tendon-actuated finger. However, the present invention can be applied to any tendon-driven robot manipulator. Consider the perspective view of a robotic finger 10 for a robotic arm shown in FIG. 1. The robotic finger 10 includes three finger sections, namely, a tip section 12, an intermediate section 14 and a base section 16. The tip section 12 includes a pad 18, the intermediate section 14 includes a pad 20 and the base section 16 includes a pad 22 that allow the finger 10 to effectively grasp a particular part (not shown). The finger sections 12, 14 and 16 and the pads 18, 20 and 22 can be made of any suitable material, such as aluminum, for a particular application. The tip section 12 pivots relative to the intermediate section 14 on a shaft 24 and the intermediate section 14 pivots relative to the base section 16 on a shaft 26.

The joints of the finger 10 are manipulated by tendons 28 in a manner that is well understood in the art. The tendons 28 are coupled to tension sensors 32, typically in the forearm area of the robotic arm. The tension sensors 32 provide a signal of the tension in the tendons 28 that provides an indication of the force on the finger 10. The tendons 28 provide a pulling force that is actuated by a suitable actuator, such as motors 34.

Assuming that all joints are revolute, the relationship between tendon tensions and joint torques can be described by:

$$\tau = Rf \tag{1}$$

Where $\tau$ if the vector of n joint torques and f is a vector of $m \geq n+1$ tendon tensions.

Note that by inverting this relationship, a set of tendon tensions that generates a specified torque can be calculated as:

$$f = R^+\tau + N(R)\lambda \tag{2}$$

Where $R^+$ is the pseudo-inverse of R and N(R) is the null space of R.

The requirements that it be possible to generate arbitrary bi-directional joint torques while applying strictly positive tendon tensions is known as force closure and can be expressed as two constraints on R. First, in order to be able to generate arbitrary joint torques, R is required to be surjective. Second, a $\lambda \in R^{m-n}$ must exist such that every element of $N(R)\lambda$ is strictly positive. When these conditions are met, the elements of equation (2) can be made strictly positive by scaling $\lambda$ by the necessary amount.

Let W be the orthogonal compliment of R such that $RW^T=0$. Vectors of tendon tension in the span of W can be referred to as internal tendon tensions. Furthermore, for convenience, the matrix R shall be augmented with its orthogonal complement, resulting in a square and full rank matrix P:

$$P = \begin{pmatrix} R \\ W \end{pmatrix} \tag{3}$$

Using this notation gives:

$$\begin{pmatrix} \tau \\ t \end{pmatrix} = Pf \tag{4}$$

Where t describes the internal tendon tension of the system.

Using a virtual work argument, it can be shown that P can also be used to describe the relationship between tendon velocities and joint velocities. Let $\dot{x}$ describe a vector of m tendon velocities and let $\dot{q}$ describe a vector of n joint velocities. Then:

$$\dot{x} = P^T \begin{pmatrix} \dot{q} \\ \dot{\theta} \end{pmatrix} \tag{5}$$

Where $\dot{\theta}$ describes the internal tendon velocity of the system, i.e., the set of tendon velocities that do not generate any joint velocity. Because internal tendon velocities do not cause the joints to move, it is only possible for the internal tendon velocity to be non-zero in the context of elastic tendons.

It will be useful to write these relationships in the frequency domain and to distinguish between the portion of the tendon attached to the actuator and the portion attached to the manipulator. Let $X_a$ be the position of the tendon at the point that is attached to the linear actuator. Let $X_j$ be the position of the tendon at the point that it is attached to the joint. When using joint-space tendon control, it is useful to express tendon positions in joint space. Recall that the relationship between joint velocities and tendon velocities given in equation (5) allowed for non-zero internal tendon velocities $\dot{\theta}$. These internal velocities are only possible on the actuator side of the tendon. On the actuator side:

$$X_a s = P^T \begin{pmatrix} Q_a \\ \Theta_a \end{pmatrix} s \tag{6}$$

Where $Q_a$ and $\Theta_a$ describe the position of the actuator-side tendons in terms of joint-space variables.

Integrating equation (6) gives:

$$X_a = P^T \begin{pmatrix} Q_a \\ \Theta_a \end{pmatrix} \tag{7}$$

Where the constant of integration is assumed to be implicit in the measurement of $X_a$.

On the joint side of the tendon, no internal velocities are possible because there is no elasticity between the joint-side tendon and the joint. Therefore, $\Theta_j$ is always zero and:

$$X_j = R^T Q_j \tag{8}$$

Where, again, the integration constant is assumed to be implicit in the $X_j$ measurement.

One embodiment of the invention uses joint-space torque control in the context of a proportional integral controller. For this control law, the desired joint space behavior is:

$$\begin{pmatrix} Q_a^* \\ \Theta_a^* \end{pmatrix} = \left(K_p + \frac{K_i}{s}\right)\left(\begin{pmatrix} \tau^* \\ t^* \end{pmatrix} - \begin{pmatrix} \tau \\ t \end{pmatrix}\right) \tag{9}$$

Where $Q_a^*$ and $\Theta_a^*$ are joint-space actuator commands, and s is the Laplace variable.

Using equations (4) and (7) gives:

$$X_a^* = P^T\left(K_p + \frac{K_i}{s}\right)\left(\begin{pmatrix} \tau^* \\ t^* \end{pmatrix} - Pf\right) \tag{10}$$

$$= \left(K_p + \frac{K_i}{s}\right)\left(P^T\begin{pmatrix} \tau^* \\ t^* \end{pmatrix} - P^T Pf\right)$$

$$= \left(K_p + \frac{K_i}{s}\right)(R^T\tau^* + W^T t^* - P^T Pf)$$

Where $k_p$ and $k_i$ are assumed to be multiples of identity.

As was done for tendon space control, the joint torque reference can be used to implement a joint compliance law as:

$$\tau^* = K_c(Q_j^* - Q_j) \tag{11}$$

The resulting joint space compliance law is:

$$X_a^* = \left(K_p + \frac{K_I}{s}\right)(R^T K_c (Q_j^* - Q_j) + W^T t^* - P^T Pf) \quad (12)$$

Figure 2:
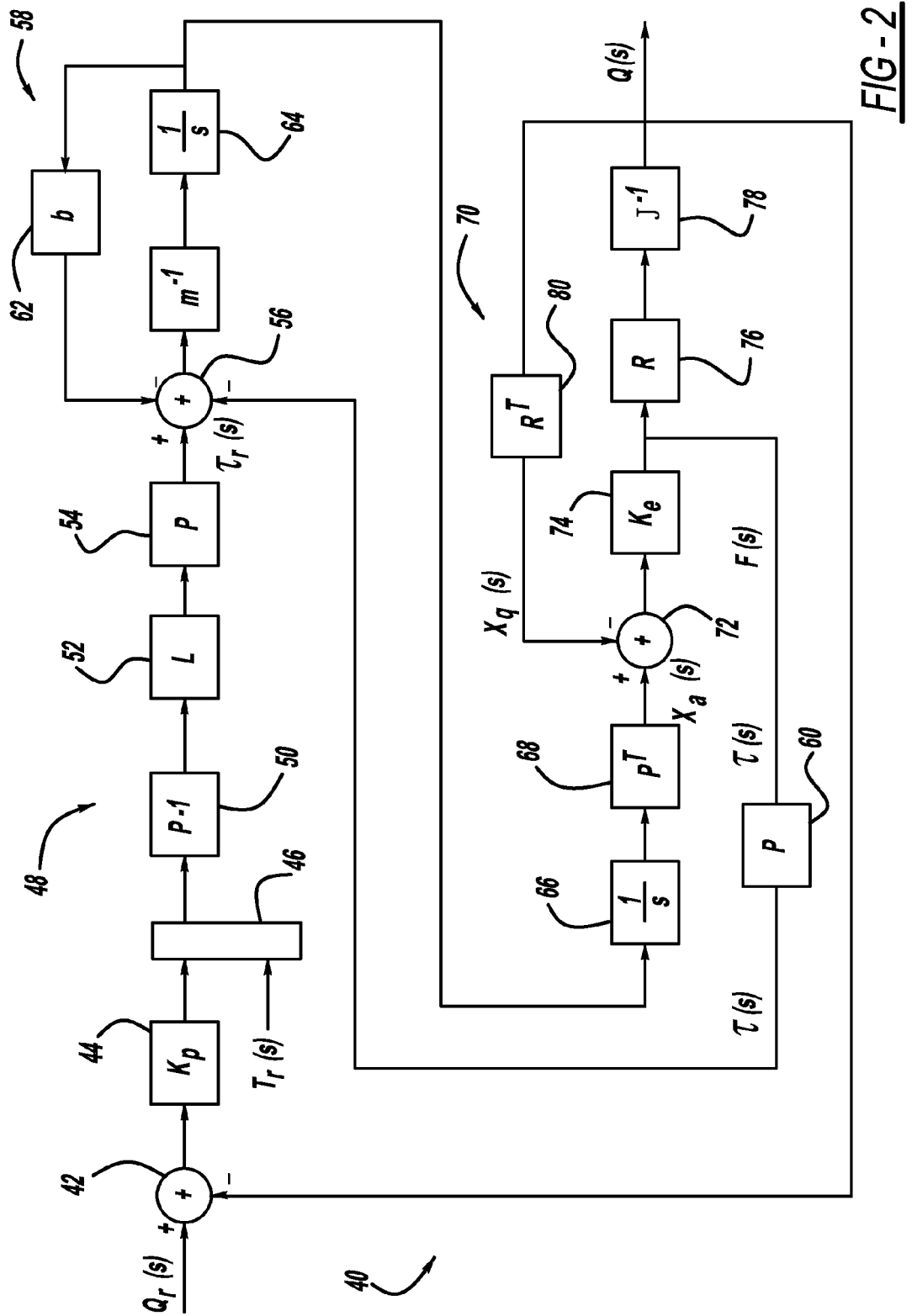
FIG. 2 is a block diagram of a control scheme for the tendons shown in FIG. 1.

The control law of equation (12) is illustrated by a block diagram in FIG. 2 for a system 40 showing process control for the algorithm within a controller 36 that controls a motor 34 to control the tension on the tendon 28 so that the desired joints are moved. The control algorithm identifies a particular joint command that is provided to a comparator 42 to generate an error signal between the joint command and a joint value at the output of the system 40. The joint command is a desired position for the particular joint being controlled. The error signal is provided to a desired stiffness block 44, identified as a proportional gain for a proportional controller, that identifies a desired joint stiffness. The proportional gain at the box 44 and a desired internal tendon tension signal are combined at block 46 and the combined signal is sent to a tension limiting portion 48 of the system 40. The tension limiting portion 48 adjusts the internal tension of the tendon 28 based on specified minimum and maximum tendon tensions. The tendon limiting portion 48 includes an inverse block 50 that converts the signal from the joint space to the tendon space using linear mapping. A limiting block 52 provides limiting in the tendon space, and a block 54 converts the signal back from the tendon space to the joint space as a toque reference signal.

The signal is then provided to a summation junction 56 in a torque controller portion 58 of the system. The torque controller portion 58 operates in the torque space. The summation junction 56 receives a torque feedback signal from a block 60 and a signal from a b block 62. The torque controller portion 58 is a proportional/integral controller that is controlling the torque of the specific joint that provides a joint displacement signal. Boxes 64 and 66 integrate the signal. Box 68 converts the signal from the desired joint displacement to a desired tendon displacement.

The tendon displacement signal is sent to the motor 34 to control the tendon tension. It is assumed that the motor contains a high-speed position controller. The effect of sending the signal to the motor 34 is modeled by a passive robot dynamics portion 70 of the system 40. A summation junction 72 models the amount by which the tendon 28 is stretched between the actuator and manipulator. A block 74 models the tendon stiffness and calculates the resulting tendon tensions. Boxes 76, 78 and 80 in the robot dynamics portion 70 all define the inertia and physical coupling of the robotic system. Using the joint displacement signal, the passive robot dynamics portion 70 models the position of the joints that is embodied in the joint value that is fed back to the comparator 42.

Another embodiment of the invention uses joint-space torque control in the context of a proportional derivative controller. For this control law, the desired joint space behavior is:

$$\begin{pmatrix} Q_a^* \\ \Theta_a^* \end{pmatrix} = \begin{pmatrix} Q_a \\ \Theta_a \end{pmatrix} - k_d \begin{pmatrix} Q_a \\ \Theta_a \end{pmatrix} s + k_p \left( \begin{pmatrix} \tau^* \\ \tau^* \end{pmatrix} - \begin{pmatrix} \tau \\ \tau \end{pmatrix} \right) \quad (13)$$

Where $k_d$ and $k_p$ are the proportional and derivative gains.
This control law can be written in the tendon space as:

$$X_a^* = X_a - k_d X_a s + k_p (R^T \tau^* + W^T t^* - P^T Pf) \quad (14)$$

Incorporating the desired joint reference position, the corresponding tendon space impedance law is:

$$X_a^* = X_a - k_d X_a s + k_p (R^T K_c (Q_j^* - Q_j) + W^T t^* - P^T Pf) \quad (15)$$

Note the similarity between equations (14) and (15). The only difference between the two control laws is the use of $P^T$ versus $P^{-1}$. Using the transpose of the inverse produces the decoupled motion in the joint-space. This is analogous to the duality associated with the Jacobian in the Cartesian control of serial manipulators. Consider the two control laws: $J^{-1} \Delta x$ and $J^T \Delta x$. The first produces straight line motion in Cartesian space, while the second produces coupled Cartesian motion.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing torque control of a tendon-driven manipulator, said method comprising:
   calculating by a processer, actuator reference positions or motor commands by projecting a torque error into a tendon position space using a single linear operation;
   calculating the torque error using sensed tendon tensions, a reference torque and internal tension; and
   limiting minimum and maximum tendon tensions by projecting the torque error into the tendon tension space and then projecting the torque error into a joint space.

2. The method according to claim 1 further comprising providing impedance control based on a joint position error.

3. The method according to claim 2 wherein positive joint stiffness is achieved by multiplying a joint space error by a stiffness constant.

4. The method according to claim 2 wherein positive joint damping is achieved by multiplying a joint space velocity error by a damping constant.

5. The method according to claim 4 wherein only a single velocity compensation term is used to provide torque controller stability and damping required by a desired impedance law.

6. The method according to claim 1 wherein limiting the tendon tensions includes converting a tendon limiting value from the joint space to the tendon space, limiting the tendon tensions, and converting the tendon tension back from the tendon space to the joint space.

7. The method according to claim 1 wherein a desired internal tendon tension is set by providing a torque reference signal to a torque controller.

8. The method according to claim 7 wherein the torque reference signal is provided to a torque controller that provides a difference between the torque reference signal and a torque feedback signal.

9. The method according to claim 1 wherein actuators are commanded by specifying a reference actuator position.

10. The method according to claim 1 wherein a proportional-integral controller is used to control torque and internal tension or joint space impedance.

11. The method according to claim 10 wherein a command actuator position is calculated by adding a velocity feedback term and a torque error term to a current actuator position.

12. The method according to claim 11 wherein a torque reference using the torque error is calculated by multiplying a joint error by a stiffness constant to realize a positive stiffness.

13. A method for providing torque control of a tendon-driven manipulator, said method comprising:
- calculating by a processor, actuator reference positions or motor commands by projecting a torque error into a tendon position space using a single linear operation;
- calculating the torque error using sensed tendon tensions, a reference torque and internal tension;
- limiting minimum and maximum tendon tensions by projecting the torque error into the tendon tension space and then projecting the torque error into a joint space including converting a tendon limiting value from the joint space to the tendon space, limiting the tendon tensions, and converting the tendon tension back from the tendon space to the joint space;
- providing a proportional-integral controller to control torque and internal tension or joint space impedance;
- calculating a command actuator position by adding a velocity feedback term and a torque error term to a current actuator position; and
- calculating a torque error reference using the torque error term by multiplying a joint error by a stiffness constant to realize a positive stiffness.

14. The method according to claim 13 further comprising providing impedance control based on a joint position error.

15. The method according to claim 14 wherein positive joint stiffness is achieved by multiplying a joint space error by a stiffness constant.

16. The method according to claim 14 wherein positive joint damping is achieved by multiplying a joint space velocity error by a damping constant.

17. The method according to claim 16 wherein only a single velocity compensation term is used to provide torque controller stability and damping required by a desired impedance law.

18. The method according to claim 13 wherein a desired internal tendon tension is set by providing a torque reference signal to a torque controller.

19. The method according to claim 18 wherein the torque reference signal is provided to a torque controller that provides a difference between the torque reference signal and a torque feedback signal.

20. The method according to claim 13 wherein actuators are commanded by specifying a reference actuator position.

* * * * *